United States Patent [19]

Varnum et al.

[11] Patent Number: 4,691,573
[45] Date of Patent: Sep. 8, 1987

[54] PRESSURE SENSOR

[75] Inventors: Gerald F. Varnum, Georgetown, Tex.; Christopher C. Duke, Lone Wolf, Okla.

[73] Assignee: Fisher Controls International, Inc., Marshalltown, Iowa

[21] Appl. No.: 874,410

[22] Filed: Jun. 16, 1986

[51] Int. Cl.⁴ .......................... G01L 7/08; G01L 11/00
[52] U.S. Cl. ........................................ 73/702; 73/706; 73/723
[58] Field of Search ................ 73/702, 706, 703, 704, 73/715, 716, 717, 718, 719, 720, 721, 722, 723, 724, 725, 726, 727, 728, 753, 754, 755

[56] References Cited

U.S. PATENT DOCUMENTS 4,126,049 11/1978 Cotter ..................................... 73/702
4,572,000 2/1986 Kooiman ............................... 73/706

Primary Examiner—Donald O. Woodiel
Attorney, Agent, or Firm—Arnold, White & Durkee

[57] ABSTRACT

A fluid filled force or pressure sensor for measuring an external force such as a fluid pressure. The apparatus includes a housing having a substantially planar backup surface, a flexible diaphragm having its radially outer portion sealed to the backup surface of the housing. A variable volume fluid chamber is formed between the backup surface and the diaphragm and is filled with a pressurized working fluid causing the diaphragm to flex outwardly away from the backup surface. The apparatus also includes a sensor chamber formed in the housing and in fluid communication with the variable volume fluid chamber. Mounted within the sensor chamber is a means for sensing variations in the density of the working fluid within the sensor chamber, such variations in density being caused by flexing of the diaphragm as a result of variations in the external pressure to be measured.

3 Claims, 3 Drawing Figures

PRESSURE SENSOR

BACKGROUND OF THE INVENTION

1. Field of the Invention

The present invention relates generally to an apparatus for sensing a force exerted by one body or fluid upon a surface. More particularly, the invention relates to an instrument for measuring pressure external to the instrument by sensing the force exerted upon a flexible diaphragm, the instrument using a vibratory element for measuring changes in density of a working fluid contained in the instrument which is responsive to movement of the diaphragm and therefore the pressure being measured.

2. Description of the Prior Art

For many years it has been increasingly important to quickly and accurately measure pressure, particularly the pressure of a fluid. Recently, it has been disclosed that a vibratory element, such as a quartz crystal, may be used to measure fluid density and thereby measure parameters which may cause the density of the fluid to change such as pressure, temperature or acceleration.

An example of this technology is disclosed in U.S. Pat. No. 4,526,480, issued to Ward. Referring specifically to FIG. 3 of Ward, there is illustrated a fluid density/pressure transducer having a hemispherically shaped housing and a flexible diaphragm sealingly mounted over an opening in the housing. Within the housing is mounted a vibratory element or tuning fork surrounded by working gas sealed within the internal chamber of the housing. Connected to the tuning fork is an oscillator circuit for causing the fork to vibrate and a display to provide a visual indication of the frecuency and therefore the pressure being observed. As the external pressure is changed, the diaphragm is caused to move inwardly into the housing with a pressure increase and outwardly from the housing with a pressure decrease. Therefore, with a changing pressure, the density of the captured working gas within the housing chamber changes. Since the frequency of resonation of the tuning fork varies in proportion to any change in the density of the working fluid surrounding the fork, the frequency observed by the display provides a highly accurate indication of the amount of pressure being exerted upon the diaphragm.

It has also been observed in the art that the range of frequency change exhibited by the fork and therefore the pressure measurement range of a device such as shown in FIG. 3 of Ward is dependent to a large extent upon maximizing the Compression Ratio. The Compression ("CR") being:

$$CR = V_1 V_2$$

Where $V_1$ is the volume of the internal space in the housing chamber when the diaphragm is exposed to minimum external pressure and $V_2$ is the volume of the internal space in the housing chamber when the diaphragm is fully flexed and exposed to the maximum external pressure. For this reason, prior art devices have attempted to minimize $V_2$, the volume of internal space in the housing chamber when the diaphragm is fully flexed.

Heretofore, prior art devices have attempted to shape the chamber housing in such a manner that the diaphragm, when fully flexed into the housing chamber, contacts and conforms to the interior surface or backup surface, of the chamber. For example, the device shown in FIG. 3 of Ward employs a hemispherical interior wall or backup surface against which the flexible diaphragm is forced upon maximum deflection.

As can be appreciated, such prior art devices are highly dependent upon one being able to accurately predict the shape of the flexible diaphragm upon maximum flexure and then fabricating the interior wall or backup surface of the housing chamber to accurately correspond to that predicted shape.

While such devices may be generally acceptable for some intended purposes, they have not proven to be entirely satisfactory in that it is very difficult to accurately predict the diaphragm shape upon full flexure. This is especially so given the wide variations in materials used for flexible diaphragms and in the methods and conditions under which the diaphragm is sealingly mounted in place on the housing.

An additional problem faced by the prior art attempts to minimize the volume of the internal space at maximum diaphragm flexure is the difficulty and expense in fabricating such a contoured curved or backup surface. Such backup surfaces are often times complex and expensive to manufacture.

Additionally, it has been recognized in the art that it is desirable that the surface finish of the backup surface be smooth and substantially free from gas entrapping irregularities. At a minimum, it is believed that the surface finish of the backup surface should be as smooth as the diaphragm surface itself. However, it often is difficult and expensive to obtain such a smooth, polished surface when the backup surface is a curved surface. Otherwise, an excessive amount of working gas may not be fully compressed upon full flexure of the diaphragm. This failure to maximize compression and the density of the working gas observed by the tuning fork results in decreasing the pressure range available from the particular instrument. Again, smooth surface finishes can be difficult and expensive to obtain during normal manufacturing procedures when the surface is curved.

As a result of the short comings of the prior art, there has developed and continues to exist a substantial need for an accurate pressure sensing device using a vibratory element that has a greater pressure measurement range while being easy to manufacture. Despite this need, an accurate pressure sensor capable of measuring pressure over a wide range has heretofore been unavailable.

SUMMARY OF THE INVENTION

It is therefore a feature of the present invention to provide an improved apparatus for sensing a force exerted by a body or a fluid upon a surface.

It is a particular feature of the present invention to provide a pressure sensor which uses a vibratory element to measure fluid density representative of the force being measured.

A still further feature of the invention is to provide a pressure sensor for measuring fluid pressure over a wide range of pressure measurements by using a vibratory element to measure a working gas density contained within the instrument which is representative of the pressure being measured.

An additional feature of the present invention is to provide a pressure sensor having a flexible diaphragm which can be easily and effectively sealed to the body of the sensor without using a special process or apparatus.

It is also a feature of the present invention to provide a pressure sensor which uses a vibratory element to measure fluid densities representative of a wide range of pressure measurements, the instrument being easily and economically manufactured.

A still further feature of the present invention is an economical and easily manufactured pressure sensor which includes a flexible diaphragm sealingly mounted on a substantially flat or planar backup surface thereby providing an internal chamber having minimum volume when the flexible diaphragm is fully flexed.

A pressure sensor according to a preferred embodiment of the invention intended to include some of the foregoing features, is utilized for measuring a force such as fluid pressure exerted upon a surface of the sensor. The pressure sensor includes a body having a substantially planar or flat backup surface and a flexible diaphragm having its radially outer portion or rim sealed to the backup surface of the body. As a result of only the circumferential portion of the flexible diaphragm being attached to the backup surface, the diaphragm and backup surface define a fluid chamber whose volume varies as the diaphragm is flexed away from or toward the backup surface. The body also includes a sensor chamber formed therein and is in fluid communication with the variable volume fluid chamber. The fluid and sensor chambers contain a pressurized working fluid, typically gas, whose density varies as the volume of the fluid chamber varies in response to the external force or pressure being applied to the flexible diaphragm. Mounted within the sensor chamber is a means for sensing variations of the density of the working fluid within the sensor chamber and producing an output corresponding to the magnitude of the external force or pressure exerted upon the diaphragm.

BRIEF DESCRIPTION OF THE DRAWINGS

So that the manner in which the above recited features of the present invention, as well as others which will become apparent, are obtained and can be understood in detail, a more particular description of the invention, briefly summarized above, may be had by reference to the embodiments thereof which are illustrated in the appended drawings, which drawings form a part of this specification.

It is to be noted, however, that the appended drawings illustrate only typical embodiments of the invention and are therefore not to be considered limiting of scope, for the invention may admit of other equally effective embodiments. In the drawing, like numerals refer to like parts, and in which.

DETAILED DESCRIPTION

The following description is directed toward the use of the subject invention in connection with measuring fluid pressure, but it should be understood that such application is given only as an example. The subject invention is equally adaptable for measuring the magnitude of any force that is applied against a surface. For example, the force may be applied by a linkage mechanism or other object to the instrument surface. The subject invention is equally adaptable for measuring or monitoring a multitude of parameters in which a force may be generated in proportion to the parameter being measured. For example, and without limitation, while the following description is directed primarily to measuring the pressure of a fluid, it can be understood that other parameters which vary in proportion to a force which can be applied to the transducer can also be measured by the subject invention.

Figure 1:
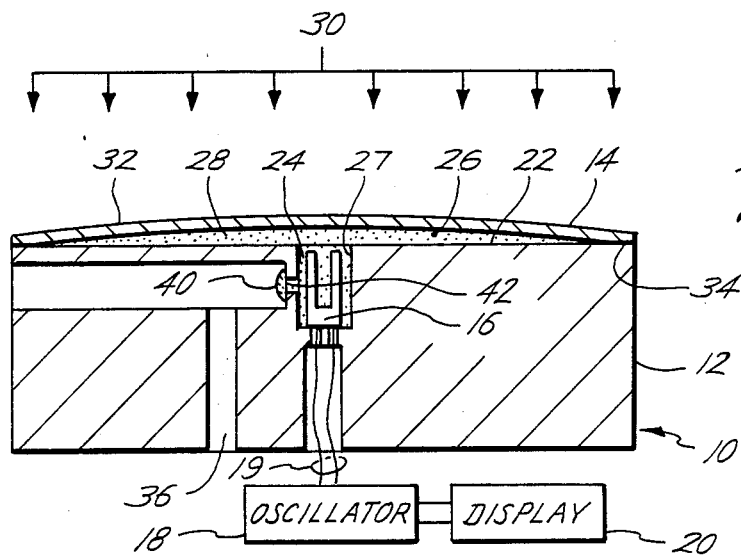
FIG. 1 is a schematic, cross-sectional view of a preferred embodiment of the invention taken along the centerline of the sensor while the sensor is fully pressurized and under minimal external pressure.

Referring now to FIG. 1, the pressure sensor is shown generally by numeral 10 and includes a body 12 which may be of generally cylindrical shape having a substantially planar or flat upper surface or backup surface 22. Mounted to backup surface 22 is flexible diaphragm 14. In the embodiment of FIG. 1, diaphragm 14 is generally circular in shape with its radially outer portion or outer rim attached to backup surface 22 of body 12 at portion 34. Flexible diaphragm 14 may be attached to surface 22 by any of several conventional means such that the radially outer portion of the flexible diaphragm 14 is maintained in sealed relationship with the backup surface 22. With respect to sealingly attaching diaphragm 14 to backup surface 22, it is contemplated that such attachment may be, for example and without limitation, accomplished by using laser welding or any other effective means for hermetically sealing the circumferential portion of diaphragm 14 to backup surface 22. As can be understood by those skilled in the art, it is preferred that diaphragm 14 be stretched and installed in tension for optimum operation of the diaphragm.

Referring again to FIG. 1, body 12 of pressure sensor 10 further includes a fluid passageway means which may be in the form of sensor chamber 24. In the embodiment shown in FIG. 1, sensor chamber 24 is formed directly in body 12 and has its upper portion opening onto backup surface 22. Sensor chamber 24 may be located in the central portion of surface 22 and body 12. While positioning sensor chamber 24 in the center portion of cylindrically shaped body 12 may be desirable, it can be understood that the location of sensor chamber 24 may be elsewhere within body 12 and yet still open onto surface 22 beneath diaphragm 14. It should also be understood that sensor chamber 24 maybe a simple fluid passageway in body 12 having an opening onto surface 22 and leading to a remotely located sensing means to be described more fully below. Remotely locating the sensing means may be preferred when environmental conditions, such as temperature, are severe.

FIG. 1 further illustrates variable volume fluid chamber 28 defined by diaphragm 14 and backup surface 22 of body 12. As can be seen in FIG. 1, sensor chamber 24 opens directly into and is in fluid communication with fluid chamber 28. Contained within fluid chamber 28 and sensor chamber 24 is a pressurized, compressible working fluid such as, for example, compressible gas, represented in FIG. 1 by particle 26. In the embodiment of FIG. 1, compressible working fluid 26 is sealed under pressure within sensor chamber 24 and fluid chamber 28. As shown in FIG. 1, when pressure sensor 10, and in particular diaphragm 14, is exposed to minimal or low external forces such as a fluid pressure represented by arrows 30, gas 26 is sufficiently pressurized above the pressure external to the sensor 10 such that diaphragm 14 is expanded outwardly away from surface 22 therefore maximizing fluid volume 28. It is contemplated that during initial assembly variable fluid volume 28 will be filled with working fluid 26 to a pressure which exceeds the pressure of the environment in which the sensor will be used, typically above atmospheric pressure. However, it can be appreciated that if the sensor were to be used in an environment whose pressure is below atmospheric pressure such as in a vacuum, it would be unnecessary to pressurize chamber 28 to a pressure in excess of atmospheric. For example and without limitation, working fluid 26 may be introduced into chambers 24, 28 through gas fill ports 36, 42 at a pressure in excess of 15 psi. Once fluid chamber 28 and sensor chamber 24 have been filled with working fluid 26 at the desired pressure, gas fill port 42 may be sealed in order to maintain working fluid 26 at its desired pressure. It is believed that the equipment and method for introducing a pressurized fluid, such as gas, into chambers 24, 28 and then sealing gas fill port 42 by a spot weld 40 are well-known in the art and additional discussion or description is unnecessary.

As previously explained, diaphragm 14 has its radially outer portion in sealed relationship with body 12 at portion 34 on backup surface 22. Prior to introduction of pressurized working fluid 26, backup surface 22 substantially conforms to or matches the lower surface of diaphragm 14 and chamber 28 is quite small. To further minimize chamber 28, the lower surface of diaphragm 14 and backup surface 22 are polished, preferably to a mirror-like finish. As can be understood, having backup surface 28 and lower diaphragm surface match one another prior to pressurization of chamber 28 by fluid 26, allows the sensor to achieve a wider range of pressure measurement.

Referring back to FIG. 1, pressure transducer 10 further includes means for sensing variations in the density of working fluid 26 contained within chambers 24, 28. In a preferred construction of the pressure sensor, the means for sensing variations in the density of the working fluid 26 may include a vibratory element mounted in chamber 24. Such a vibratory element may be a single ended vibratable tuning fork 16, using a material such as crystalian quartz. As can be understood by one skilled in the art, such a vibratory element may take any of several forms and may consist of one of various materials, which may properly function in place of the crystalline quartz.

In addition to the vibratory element 16, the pressure sensor means may include means for causing the vibratory element 16 to resonate, with the frequency of resonation varying with variation in the density of the working fluid 26 surrounding the element 16. In the embodiment of FIG. 1, the means for causing element 16 to resonate is a conventional oscillator circuit 18 coupled by conductor lines 19 to tuning fork 16. As can be understood by one skilled in the art, application of AC signals by oscillator 18 to tuning fork 16 produces vibration in the fork 16 in a well-known manner and at a characteristic or desired natural resonant frequency. In addition to oscillator 18, a conventional counter and display 20 may be connected to oscillator 18 to provide a read out of the frequencies being observed by oscillator 18.

As can be understood by those skilled in the art, as external pressure 30 is increased, flexible diaphragm 14 is forced closer toward the backup surface 22. As flexure of diaphragm 22 occurs, the density of working fluid 26 contained within chambers 24, 28 is increased. As a result of this increase in density of fluid 26, the frequency of vibration of fork 16 is changed with the degree of change being directly representative of the change in density of fluid 26 and, likewise, the amount of external pressure being exerted upon flexible diaphragm 14.

Oscillator 18 which is connected by leads 19 to turning fork 16, follows the frequency of tuning fork 16 and therefore any change in frequency of fork 16 can be measured by measuring the output frequency of oscillator 18 and observed by display 20. It is contemplated that oscillator 18 may be adapted for producing an output signal to display 20 which directly corresponds to the force or pressure being measured by pressure sensor 10. As can be understood, display 20 may be configured such that the user of the instrument may read directly the value of the parameter being measured such as pressure in pounds per square inch.

Figure 2:
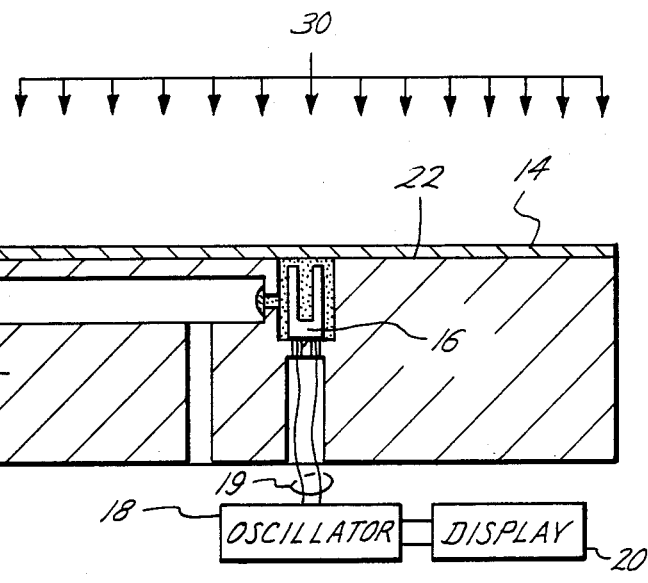
FIG. 2 is similar to FIG. 1 but the sensor is under maximum external pressure.

Referring now to FIG. 2, the pressure sensor 10 is shown with maximum external pressure being applied to diaphragm 14. It can be seen that maximum external pressure 30 has forced diaphragm 14 downwardly, as shown in FIG. 2, toward backup surface 22 such that working fluid 26 is at its maximum density within sensor chamber 24 and the volume of fluid chamber 28 is at its minimum. When external pressure 30 is at its maximum and the density of working fluid 26 is at its maximum, tuning fork 16 will reflect the maximum external pressure. From an examination of FIG. 2, the advantages of utilizing a backup surface which substantially conforms to or matches the diaphragm prior to pressurization of chamber 28 and in particular using a substantially planar or flat backup surface 22 can be appreciated. When pressure 30 is at a maximum, fluid volume 28 has been greatly minimized due to the ability of flexible diaphragm 14 to easily conform to the shape of backup surface 22 since this is the original shape and position of the diaphragm prior to assembly. It is also apparent to one skilled in the art that a flat backup surface 22 and the matching surface of diaphragm 14 are preferably formed with polished, smooth surface such that gas entrapping irregularities are not present between surface 22 and diaphragm 14 during maximum external pressure. Since both diaphragm 14 and backup surface 22 are substantially matching surfaces in their relaxed state, i.e., flat, prior to assembly and pressurization by gas 26, fabrication of a smooth, polished surface 22 and diaphragm 14 are quite easily accomplished through well-known methods.

Sensor chamber 24 is shown in FIGS. 1 and 2 as being formed within body 12 and having its upper end opening onto variable fluid chamber 28. Although this configuration may be preferred, it should be understood that the shape and location of sensor chamber 24 may vary depending upon the particular use of the pressure sensor. However, it is preferred that the volume of working fluid 26 contained within sensor chamber 24 when sensor 10 is exposed to maximum external pressure be minimized. One preferred embodiment of sensor chamber 24 is a chamber having a substantially square or rectangular transverse cross-section such that the space between tuning fork 16 and the interior wall 27 of chamber 24 is minimized. However, as can be understood by one skilled in the art, it is necessary that sufficient space be provided between the tuning fork 16 and wall 27 such that proper operation of the tuning fork is possible. Given a particular size and type of tuning fork, the size and shape of sensor chamber 24 may be optimized by one skilled in the art.

Flexible diaphragm 14 may be fabricated from any one of several materials which are capable of flexing or moving in response to a force or pressure applied to its external surface. Flexible diaphragm 14 should have sufficient strength and a sufficiently high modulus of elasticity as to permit flexure in response to an external pressure while having minimal mechanical hysteresis characteristics. Moreover, the choice of material for diaphragm 14 depends to a large extent upon whether the diaphragm itself will be exposed to corrosive or other damaging fluids or environments. Likewise, the thickness of diaphragm 14 is also dependent upon the exact environment in which the instrument will be used and the pressure range and other operating characteristics desired. Generally, it is preferred that diaphragm 14 be of a material having a high modulus of elasticity such as steel alloys of nickel or monel content. For example and without limitation, it is believed that a diaphragm of an alloy steel of the 300 series which has been fully hardened and approximately 0.001 to 0.005 inch thick would be acceptable for many normal applications.

As for the compressible working fluid, it is believed that a compressible gas such as nitrogen or argon may be used as a working fluid although those skilled in the art can readily recognize that other compressible gases could be used as acceptable working fluids.

As illustrated in FIG. 1, it is contemplated that a preferred embodiment of the subject invention will contain a pressurized gas sealed within the fluid chamber 28 and sensor chamber 24. The degree of pressurization of working fluid above the environmental pressure in which the sensor will be used will also be quite dependent upon the exact measurement pressure ranges and operating characteristics desired for the particular instrument. However, it is contemplated that the pressure of working fluid 26 will be sufficient to cause outward flexure or bulging of diaphragm 24 during use such that chamber 28 is formed in a size sufficient to accommodate the desired pressure ranges. For example and without limitation, if nitrogen gas were used as a working fluid, it is believed that a pressure of approximately 5.5 psig would be sufficient positive pressure for an acceptable pressure sensor having a 0.001" thick diaphragm with a 1" diameter assuming the sensor is used under standard atmospheric conditions. Under these conditions, the separation or spacing between diaphragm 14 and backup surface 22 at the center point of the circular diaphragm is approximately 0.011".

As previously pointed out, it is possible to determine the magnitude of an external force such as a gas pressure by measuring frequency changes in tuning fork 16. As the density of working gas 26, and therefore the external force being observed, around the tuning fork 16 changes, the natural frequency of the tuning fork changes. This change in frequency allows the external pressure being applied to diaphragm 14 to be measured by simply observing the changes in the frequency of vibration of the tuning fork as communicated to the display 20 by oscillator 18.

The range of change in density in the working fluid 26, and accordingly the range of pressure to be measured, is maximized by the present invention by the use of a backup surface which conforms to, as closely as possible, the deflected surface of the diaphragm 14 when it is exposed to maximum external pressure. Use of such a backup surface insures that the gas 26 is compressed into the smallest volume possible, which gives the pressure sensor the greatest possible range of measurement.

Since the present invention utilizes a substantially flat backup surface which matches the diaphragm in the relaxed and maximum pressure conditions, it can be understood by those skilled in the art that the diaphragm can be more effectively and easily sealed around its outer radial portion to the instrument body. It can also be understood by those skilled in the art that since the diaphragm and backup surface are matched to each other and have substantially the same shaped surfaces, in particular flat, prior to pressurization of the internal chamber 28, the diaphragm will not buckle or snap as an external pressure is applied to the pressurized diaphragm during use even though the external pressure may greatly exceed the maximum pressure range of the sensor.

Figure 3:
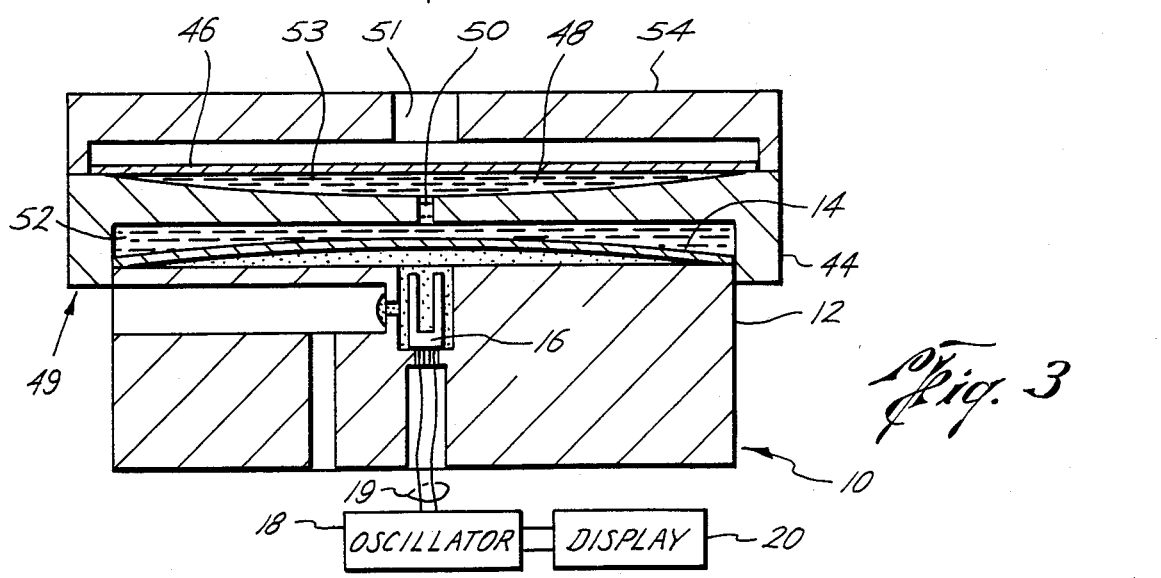
FIG. 3 is a schematic, partial cross-sectional view of another embodiment of the invention.

Referring now to FIG. 3, a second embodiment of the present invention is disclosed wherein the pressure sensor 10 as previously disclosed includes an enclosure cover 49 attached to body 12 and enclosing flexible diaphragm 14. It is contemplated that the embodiment of FIG. 3 be used to observe pressures under conditions of high temperature or corrosiveness.

The embodiment of FIG. 3 includes enclosure cover 49 which, for ease of manufacture and assembly, may consist of cover body 44 and cap 54. Cover body 44 may be circular in shape and attached directly to body 12 to enclose diaphragm 14 as shown in FIG. 3. Formed within cover body 44 is an isolation chamber composed of first chamber 48 and second chamber 52 in fluid communication with one another through opening 50. Attached to the upper surface of cover body 44 is an isolation diaphragm 46 having its radially outer portion secured to body 44. As a result of diaphragm 46 being sealingly attached to the upper portion of body 44 and diaphragm 14 forming a portion of chamber 52 in the lower portion of body 44, first and second chambers 48, 52 form a single closed chamber. Contained within chambers 48, 52 is incompressible isolation fluid represented by particles in FIG. 3 designated 53. Fluid 53 may be any acceptable incompressible fluid well known in the industry such as Dow Corning 200 silicon fluid.

Isolation diaphragm 46 may take any of several forms known in the industry and its operating characteristics will be dependent upon the exact environment and pressure ranges to be observed but preferably may be a corrugated diaphragm (not shown) to minimize hysteresis and from about 0.002" to 0.010" in thickness.

Also attached to the upper portion of cover body 44 is cap 54 which serves to protect diaphragm 46 and assist in communicating the fluid to be observed directly to diaphragm 46. Port 51 is provided in cap 54 such that the fluid being observed may be brought into direct contact with diaphragm 46.

As can be understood by one skilled in the art, the embodiment of FIG. 3 allows the pressure sensor 10 to measure pressure of a fluid which may be of extremely high temperature or corrosiveness as to harmfully effect diaphragm 14. Accordingly, the corrosive or high temperature fluid can be communicated directly to isolation diaphragm 46, diaphragm 46 being fabricated of a material which is highly resistive to the temperature or corrosive effects of the fluid to be measured. Pressure 30 of the fluid to be measured is communicated through port 51 to isolation diaphragm 46 which flexes inwardly in response to pressure 30 toward diaphragm 14 thereby causing isolation fluid 53 to transmit pressure directly to diaphragm 14 and causing the pressure sensor to operate as previously described to produce an output representative of the pressure of the external fluid to be measured without exposing the possibly sensitive diaphragm 14 directly to excessive temperature or corrosiveness.

As can be understood, the embodiment of FIG. 3 utilizes the pressure sensor embodiment previously described and shown in FIGS. 1 and 2 but further including a means for preventing direct contact of diaphragm 14 with the external fluid to be measured.

Further modifications and alternative embodiment of the apparatus of this invention will be apparent to those skilled in the art in view of this description. Accordingly this description is to be construed as illustrative only and is for the purpose of teaching those skilled in the art a manner of carrying out the invention. It is to be understood that the forms of the invention herein shown and described are to be taken as the presently preferred embodiments. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. A fluid filled pressure transducer for measuring the pressure of an external fluid comprising:
   a sensor body having a substantially planar backup surface;
   a flexible diaphragm having a radially outer portion in sealed relationship with the backup surface of the sensor body;
   a variable volume fluid chamber defined by the backup surface and the diaphragm;
   a sensor chamber formed in the sensor body and in fluid communication with the variable volume fluid chamber;
   a pressurized, compressible working fluid contained in the fluid and sensor chambers;
   means mounted in the sensor chamber for sensing variations in the density of the working fluid within the sensor chamber;
   an enclosure cover attached to the sensor body and enclosing the flexible diaphragm;
   an isolation diaphragm having a radially outer portion secured to said enclosure cover, said isolation diaphragm and enclosure cover forming a isolation chamber in fluid communication with said flexible diaphragm; and
   a substantially incompressible isolation fluid contained in the isolation chamber whereby pressure exerted upon the isolation diaphragm is communicated by said isolation fluid to said flexible diaphragm.

2. The pressure sensor of claim 1 wherein said means for sensing density variations includes:
   a vibratory element;
   means for causing the element to resonate at a frequency, the frequency varying with variations in the density of the working fluid and thus the pressure exerted on the diaphragm; and
   means for measuring the frequency of the element and transforming said frequency measurement to a measurement representative of the pressure being sensed.

3. A pressure sensor comprising:
   a flexible diaphragm having a sufficiently high modulus of elasticity as to minimize mechanical hysteresis of the diaphragm;
   a body having a substantially planar backup surface in sealed relationship with the diaphragm and defining a variable volume fluid chamber between the diaphragm and the backup surface, and wherein the lower surface of the diaphragm and the backup surface are polished surfaces;
   a compressible working fluid contained in the fluid chamber;
   means for sensing variations in the density of the working fluid; and
   a fluid passageway means connected to said sensing means and opening to said fluid chamber for providing fluid communication between said fluid chamber and said sensing means.

* * * * *

UNITED STATES PATENT AND TRADEMARK OFFICE
CERTIFICATE OF CORRECTION

PATENT NO. : 4,691,573
DATED : September 8, 1987
INVENTOR(S) : Gerald F. Varnum and Christopher C. Duke It is certified that error appears in the above-identified patent and that said Letters Patent is hereby corrected as shown below:

Column 1, line 34, delete "frecuency" and insert --frequency--.

Column 1, line 54, insert --/-- between "$V_1$" and "$V_2$".

Column 1, lines 51-52, after the word "Compression" insert --Ratio--.

Signed and Sealed this

Twenty-ninth Day of March, 1988

*Attest:*

DONALD J. QUIGG

*Attesting Officer*   *Commissioner of Patents and Trademarks*